United States Patent
Steiner

(10) Patent No.: US 12,142,984 B2
(45) Date of Patent: Nov. 12, 2024

(54) TRANSDUCER APPARATUS HAVING MAGNETIC FLUX GENERATORS WITH POLE PIECES, RECIPROCATORS AND CLOSING PIECES FOR CHANNELING MAGNETIC FLUX

(71) Applicant: Etalim Inc., Burnaby (CA)

(72) Inventor: Thomas Walter Steiner, Burnaby (CA)

(73) Assignee: ETALIM INC., Burnaby (CA)

( * ) Notice: Subject to any disclaimer, the term of this patent is extended or adjusted under 35 U.S.C. 154(b) by 178 days.

(21) Appl. No.: 17/864,216

(22) Filed: Jul. 13, 2022

(65) Prior Publication Data
US 2023/0018365 A1 Jan. 19, 2023

Related U.S. Application Data

(60) Provisional application No. 63/222,065, filed on Jul. 15, 2021.

(51) Int. Cl.
*H02K 33/12* (2006.01)
*H01F 7/06* (2006.01)
*H02K 35/02* (2006.01)

(52) U.S. Cl.
CPC .............. *H02K 33/12* (2013.01); *H01F 7/06* (2013.01); *H02K 35/02* (2013.01)

(58) Field of Classification Search
CPC ........ H02K 33/00; H02K 33/12; H02K 33/02; H02K 35/02; H02K 35/00; H02K 35/04; H02N 2/188; H01F 7/06

(Continued)

(56) References Cited

U.S. PATENT DOCUMENTS 3,928,988 A * 12/1975 Luth .......................... H01F 7/14
66/138
4,020,433 A * 4/1977 Uchidoi .................. H01F 7/064
335/230

(Continued)

FOREIGN PATENT DOCUMENTS

CN 108808979 B * 7/2022 ............. H02K 35/02
CZ 304690 B6 * 9/2014 ................ F02B 1/12

(Continued)

*Primary Examiner* — Maged M Almawri
(74) *Attorney, Agent, or Firm* — Yiwen Artemis Lai

(57) ABSTRACT

An electromechanical transducer apparatus for converting between mechanical energy and electrical energy is disclosed and includes first and second magnetic flux generators including pole pieces coupled to direct magnetic flux. The magnetic flux generators are disposed such that opposite polarity pole pieces are spaced apart in adjacent relation. A pair of reciprocators are coupled for reciprocating movement between the pole pieces and are spaced apart by first and second air gaps. A closing piece completes a magnetic circuit and when the reciprocators are disposed such that the first air gap is smaller than the second air gap, magnetic flux generated by the first magnetic flux generator flows in a first direction via the first air gap through the closing piece. When the reciprocators are disposed such that the second air gap is smaller than the first air gap, magnetic flux generated by the second magnetic flux generator flows in a second opposite direction via the second air gap through the closing piece. A current carrying coil is disposed to electromagnetically interact with the magnetic flux.

22 Claims, 7 Drawing Sheets

(58) Field of Classification Search
USPC ......... 310/12.26, 12.16, 12.25, 12.12, 12.15, 310/12.01, 15–38; 335/222, 230, 234; 381/396, 400; 417/417
See application file for complete search history.

(56) References Cited

U.S. PATENT DOCUMENTS

| | | | | |
|---|---|---|---|---|
| 4,260,914 A * | 4/1981 | Hertrich | .................... | G01P 3/52 310/15 |
| 4,315,197 A * | 2/1982 | Studer | .................... | H02K 35/06 335/229 |
| 4,367,449 A * | 1/1983 | Veisz | .................... | H01F 7/08 335/229 |
| 4,500,827 A * | 2/1985 | Merritt | .................... | H02K 35/02 322/3 |
| 4,727,344 A * | 2/1988 | Koga | .................... | H01H 51/2209 335/229 |
| 4,881,054 A * | 11/1989 | Polgar | .................... | H01H 51/2236 335/230 |
| 5,394,131 A * | 2/1995 | Lungu | .................... | H01H 51/2209 335/265 |
| 5,587,615 A * | 12/1996 | Murray | .................... | H02K 33/16 310/15 |
| 5,833,211 A * | 11/1998 | Berling | .................... | F04B 53/1082 251/129.09 |
| 6,262,500 B1 * | 7/2001 | Wakiwaka | .................... | H02K 33/16 310/15 |
| 6,598,621 B1 * | 7/2003 | Wygnanski | .................... | F16K 31/082 137/66 |
| 6,614,137 B2 * | 9/2003 | Joong | .................... | H02K 41/031 318/135 |
| 7,498,681 B1 * | 3/2009 | Kellogg | .................... | H02K 35/02 290/1 R |
| 7,710,227 B2 * | 5/2010 | Schmidt | .................... | H02K 35/02 310/171 |
| 7,948,124 B1 * | 5/2011 | Waters | .................... | H02K 35/00 310/36 |
| 8,593,018 B2 * | 11/2013 | Furuich | .................... | H02K 33/16 310/17 |
| 9,240,267 B2 * | 1/2016 | Nagahara | .................... | H02K 35/02 |
| 9,509,304 B2 * | 11/2016 | Ruff | .................... | G08C 17/00 |
| 9,929,597 B2 * | 3/2018 | Jaskolski | .................... | H01F 38/14 |
| 10,122,250 B2 * | 11/2018 | Antonelli | .................... | H02K 35/00 |
| 10,404,150 B2 * | 9/2019 | Swanson | .................... | H02K 35/06 |
| 11,114,926 B2 * | 9/2021 | Delette | .................... | H02K 35/02 |
| 11,716,005 B2 * | 8/2023 | Tosoni | .................... | H02K 35/02 310/12.01 |
| 11,732,769 B2 * | 8/2023 | Clymer | .................... | H02K 49/106 188/267 |
| 11,742,852 B2 * | 8/2023 | Liu | .................... | H03K 17/00 361/628 |
| 11,916,462 B2 * | 2/2024 | Haronian | .................... | H02K 1/34 |
| 2005/0029874 A1 * | 2/2005 | Dadd | .................... | H02K 33/12 310/12.12 |
| 2006/0138875 A1 * | 6/2006 | Kim | .................... | F04D 33/00 310/15 |
| 2010/0323644 A1 * | 12/2010 | Bataille | .................... | H02K 35/06 455/127.1 |
| 2011/0198949 A1 * | 8/2011 | Furuich | .................... | H02K 33/16 310/25 |
| 2012/0104875 A1 * | 5/2012 | Park | .................... | H02K 33/16 310/25 |
| 2012/0175974 A1 * | 7/2012 | Robertson | .................... | H01F 7/1646 310/12.26 |
| 2012/0311871 A1 * | 12/2012 | Heckman | .................... | B26B 19/282 310/15 |
| 2017/0141668 A1 * | 5/2017 | Xing | .................... | H02K 1/34 |
| 2018/0131371 A1 * | 5/2018 | Liu | .................... | H03K 17/94 |
| 2019/0036386 A1 * | 1/2019 | Vandenberg | .................... | H02K 21/00 |
| 2019/0348896 A1 * | 11/2019 | Delette | .................... | H02K 35/02 |
| 2020/0044526 A1 * | 2/2020 | Tang | .................... | H02K 33/18 |
| 2022/0320986 A1 * | 10/2022 | Bayaliev | .................... | H02K 35/06 |
| 2022/0360157 A1 * | 11/2022 | Haronian | .................... | H02K 35/02 |
| 2023/0112671 A1 * | 4/2023 | Shim | .................... | H02K 33/16 310/28 |

FOREIGN PATENT DOCUMENTS

| | | | | |
|---|---|---|---|---|
| GB | 2479926 A * | 11/2011 | ............. | G01P 3/22 |
| KR | 100740560 B1 * | 7/2007 | | |
| WO | WO-0020786 A1 * | 4/2000 | ............. | F16K 31/003 |
| WO | WO-0101551 A1 * | 1/2001 | ............. | H02K 53/00 |
| WO | WO-2005115094 A2 * | 12/2005 | ............. | H02K 33/16 |
| WO | WO-2021102316 A1 * | 5/2021 | ............. | H02K 35/02 |

* cited by examiner

TRANSDUCER APPARATUS HAVING MAGNETIC FLUX GENERATORS WITH POLE PIECES, RECIPROCATORS AND CLOSING PIECES FOR CHANNELING MAGNETIC FLUX

BACKGROUND

1. Field

This disclosure relates generally to an electromechanical transducer apparatus for converting mechanical energy to electrical energy and/or electrical energy to mechanical energy and more particularly to an electromechanical transducer apparatus configured to facilitate magnetic flux reversal within a magnetic circuit of the transducer.

2. Description of Related Art

Electromechanical transducers are commonly used for energy conversion between mechanical and electrical energy. For example, mechanical motion produced by an external system may be coupled to a moving portion of an electromechanical transducer, and an electrical potential difference will be developed between terminals of the transducer. Alternatively the electromechanical transducer may cause movement of the moving portion in response to receiving a suitable current via the terminals.

While many electromechanical transducers are configured for rotary motions, some electromechanical transducers are configured for linear motion or a linearly reciprocating motion. One possible application for a linearly reciprocating electromechanical transducer is in a Stirling cycle transducers, where the reciprocating motion may have a relatively small amplitude and relatively high frequency. In one example disclosed in commonly owned PCT Patent Application Publication WO 2011/003207 by Steiner Thomas W. et al. published on Jan. 13, 2011 and entitled "Stirling Cycle Transducer for Converting between Thermal Energy and Mechanical Energy", the amplitude of motion is about 200 μm and the frequency about 500 Hz. Conventional electromechanical transducers may not be able to operate efficiently under these drive conditions. There remains a need for improved configurations of linearly reciprocating electromechanical transducers.

SUMMARY

In accordance with one disclosed aspect there is provided an electromechanical transducer apparatus for converting between mechanical energy and electrical energy. The apparatus includes a first magnetic flux generator and a second magnetic flux generator, each including a pole piece coupled to direct magnetic flux from the magnetic flux generator and a pole piece coupled to direct magnetic flux back to the magnetic flux generator. The first and second magnetic flux generators are adjacently disposed such that pole pieces of the first and second magnetic flux generators having opposite polarity are adjacently disposed in spaced apart relation. The apparatus also includes a pair of reciprocators mechanically coupled for reciprocating movement between the adjacently disposed pole pieces of the first and second magnetic flux generators, each of the pair of reciprocators being spaced apart from the pole pieces of the first magnetic flux generator by a first air gap and spaced apart from the pole pieces of the second magnetic flux generator by a second air gap. The apparatus further includes a closing piece disposed to complete a magnetic circuit for channeling magnetic flux generated by either of the first and second magnetic flux generators between the pair of reciprocators. When the pair of reciprocators are disposed such that the first air gap is smaller than the second air gap, magnetic flux generated by the first magnetic flux generator flows in a first direction via the first air gap through the closing piece. When the pair of reciprocators are disposed such that the second air gap is smaller than the first air gap, magnetic flux generated by the second magnetic flux generator flows in a second direction via the second air gap through the closing piece, the second direction being opposite to the first direction. The apparatus also includes at least one current carrying coil disposed to electromagnetically interact with the magnetic flux passing through the magnetic circuit.

The closing piece may extend directly between the pair of reciprocators and moves in unison with the pair of reciprocators.

The pair of reciprocators and the closing piece may be fabricated as a unitary element.

The coil may be wound about the closing piece spaced apart from the closing piece to provide for free reciprocating movement of the closing piece within the coil, the coil being mounted statically with respect to the first and second magnetic flux generators.

The pair of reciprocators may include an overlapping portion overlapping the respective pole pieces and an outwardly extending portion extending outwardly away from the respective pole pieces and the closing piece may extend between the respective outwardly extending portions of the pair of reciprocators for completing the magnetic circuit.

The closing piece may be statically disposed in relation to the first and second magnetic flux generators and spaced apart from each of the pair of reciprocators by a sliding air gap to facilitate motion of the pair of reciprocators while coupling magnetic flux through the closing piece via the respective sliding air gaps.

The pair of reciprocators may be mechanically coupled via a spring suspension to the pole pieces.

The spring suspension may include a tube spring.

The apparatus may include a current source connected to supply an alternating current to the coil, the alternating current being operable to electromagnetically induce a changing magnetic flux within the closing piece, the changing magnetic flux varying in magnitude and direction and being operable to cause a corresponding alternating force on the pair of reciprocators.

The apparatus may include an actuator operable to cause alternating motion of the pair of reciprocators, the alternating motion causing a changing magnetic flux in the magnetic circuit operable to electromagnetically induce an electromotive force (emf) in the coil.

Each of the pole pieces may extend laterally with respect to the respective first and second magnetic flux generators and each may have an overlapping portion overlapping respective reciprocators of the pair of reciprocators, the overlapping portions providing the respective first and second air gaps.

The pair of reciprocators may be configured for movement with an amplitude of about 400 μm.

A cross sectional area of the pair of reciprocators may be less than a cross sectional area of the first and second magnetic flux generators.

The pair of reciprocators may be fabricated from a cobalt electrical steel alloy.

The apparatus may include at least one additional magnetic flux generator including respective pole pieces, an associated pair of reciprocators, and an associated closing piece, the at least one additional magnetic flux generator being disposed such that the associated pair of reciprocators are shared between the at least one additional magnetic flux generator and one of the first and second magnetic flux generators, the associated pair of reciprocators being mechanically coupled to the pair of reciprocators disposed between the first magnetic flux generator and the second magnetic flux generator, and at least one associated current carrying coil disposed to electromagnetically interact with the magnetic flux passing through each associated magnetic circuit.

The at least one additional magnetic flux generator may include a plurality of additional magnetic flux generators, and at least one of the coils may be disposed to electromagnetically interact with the magnetic flux passing through more than one of the magnetic circuits.

The first magnetic flux generator, the second magnetic flux generator, and the at least one additional magnetic flux generator may be disposed in a wrapped around configuration such that each of the magnetic flux generators are disposed adjacently with a respective pair of reciprocators between the adjacent magnetic flux generators.

The first magnetic flux generator, the second magnetic flux generator, and the at least one additional magnetic flux generator may be disposed in a stacked configuration such that each of the magnetic flux generators are disposed adjacently with a respective pair of reciprocators between the adjacent magnetic flux generators.

The apparatus may include a further pair of reciprocators and associated closing piece adjacently disposed to the magnetic flux generator at a top end of the stacked configuration, and a further pair of reciprocators and associated closing piece adjacently disposed to the magnetic flux generator at a bottom end of the stacked configuration.

A plurality of the stacked configuration may be disposed alongside each other with the respective pairs of reciprocators of each stacked configuration being mechanically coupled for motion.

The pair of reciprocators may be coupled to an at least partially compliant shaft having first and second ends, the compliant shaft being operable to cause the reciprocating motion at one end of the shaft to have a greater amplitude than a reciprocating motion at another end of the shaft.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1A:
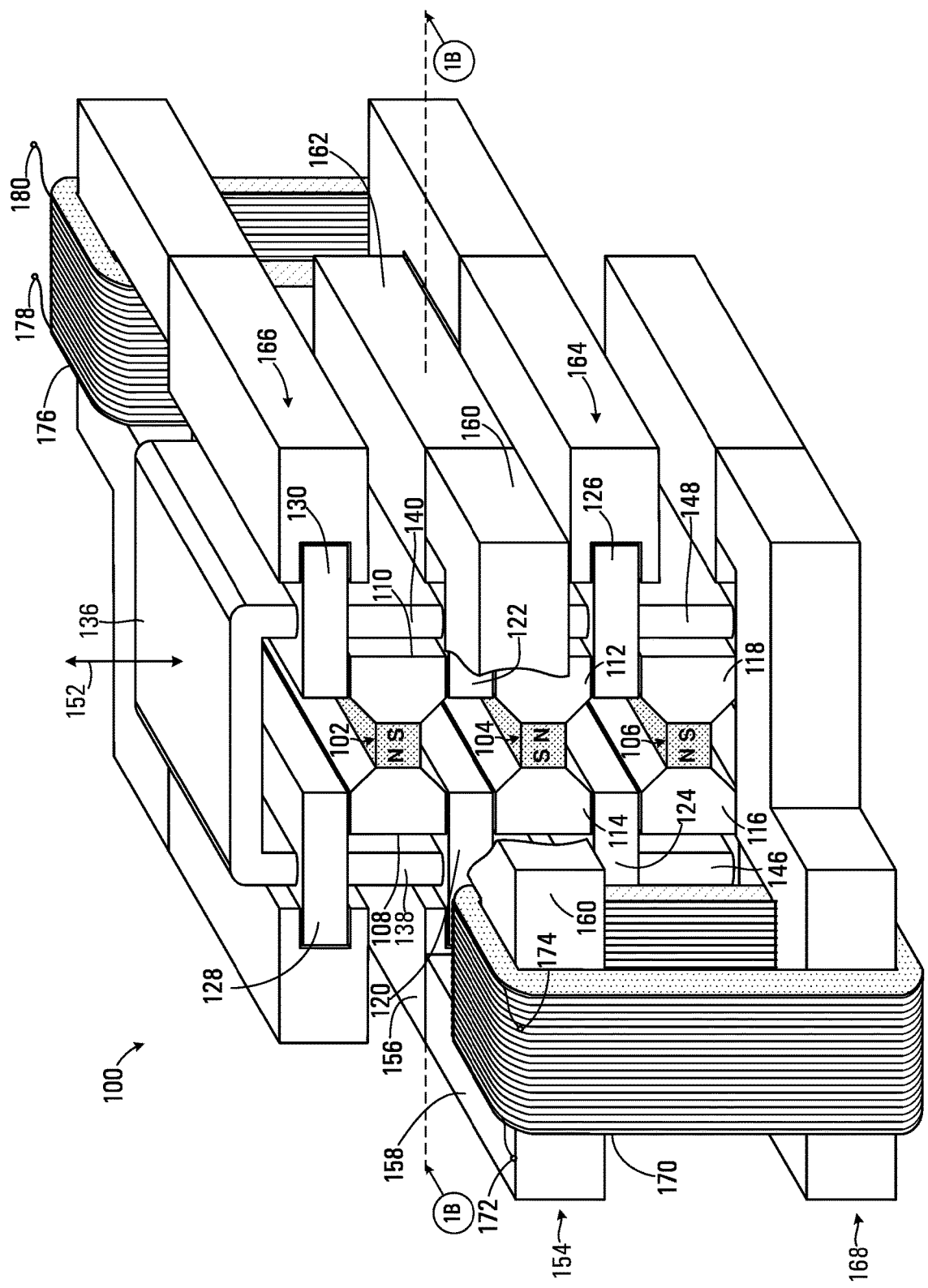
FIG. 1A is a perspective view of an electromagnetic transducer apparatus according to a first disclosed embodiment.

Referring to FIG. 1A, an electromagnetic transducer apparatus according to a first disclosed embodiment is shown generally at 100. The apparatus 100 includes a first magnetic flux generator 102, a second magnetic flux generator 104, and a third magnetic flux generator 106. The magnetic flux generators 102-106 may be implemented using permanent magnets having north and south poles as indicated by the letters "N" and "S" in FIG. 1A. As an example, in one embodiment the magnetic flux generators may be implemented using sintered high temperature Neodymium/Iron/Boron magnets, which may be bonded together in an array to form the each of the magnetic flux generators 102-106. Each magnetic flux generator 102-106 further includes a pole piece coupled to direct magnetic flux from the magnetic flux generator and a pole piece coupled to direct magnetic flux back to the magnetic flux generator. The first magnetic flux generator 102 thus includes pole pieces 108 and 110, the second magnetic flux generator 104 includes pole pieces 112 and 114, and the third magnetic flux generator 106 includes pole pieces 116 and 118. The magnetic flux generators 102-106 are disposed such that pole pieces of the first and second magnetic flux generators having opposite polarity are adjacently disposed in spaced apart relation. The pole pieces 108 and 116 having N-polarity and this opposite in polarity to the adjacently located pole piece 114 having a S-polarity. Similarly, the pole pieces 110 and 118 having S-polarity and are opposite in polarity to the adjacently located pole piece 112 having a N-polarity.

Figure 1B:
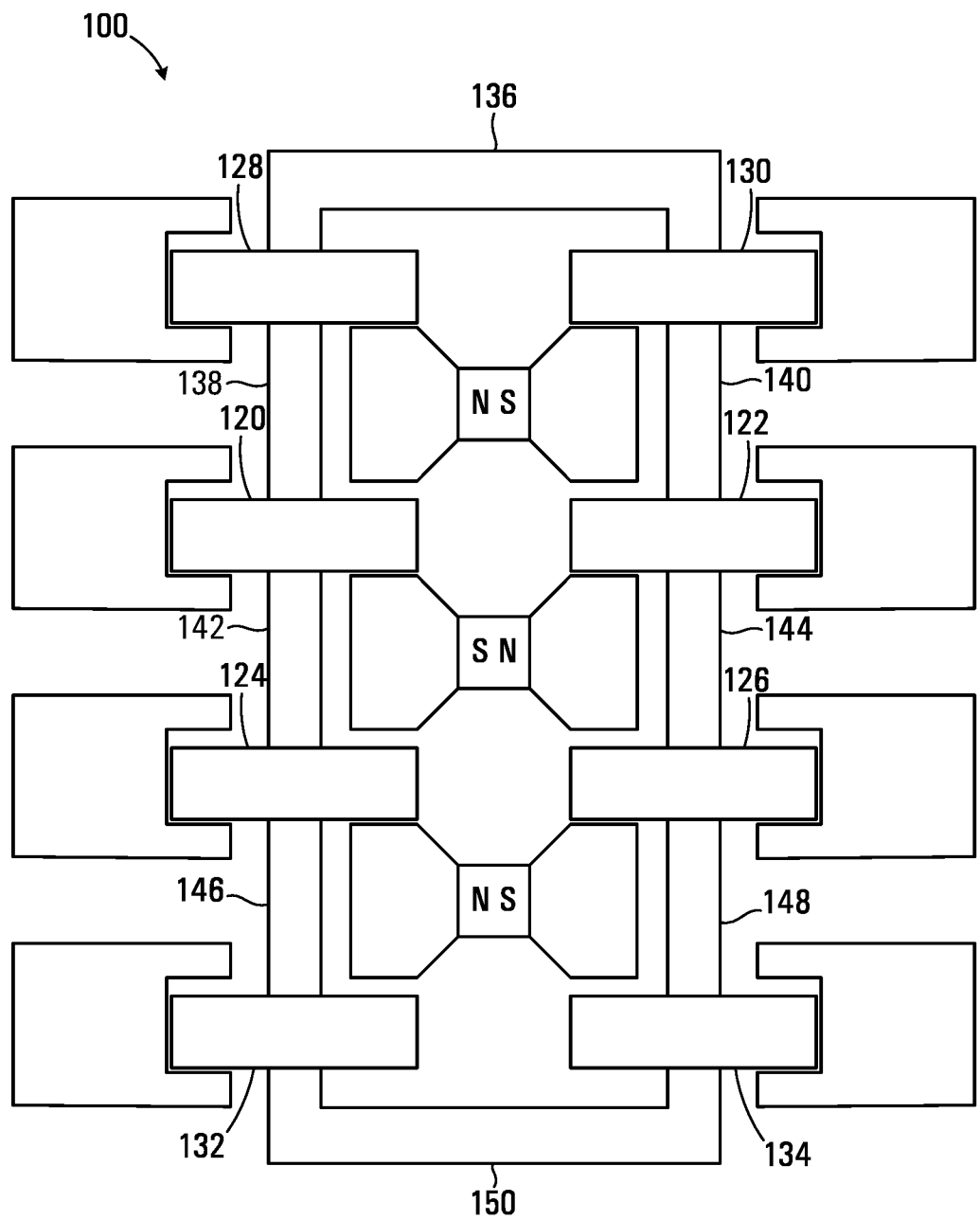
FIG. 1B is a schematic cross sectional view taken along the line 1B-1B in FIG. 1A.

The apparatus 100 also includes a pair of reciprocators between each respective adjacently disposed pole pieces. A pair of reciprocators 120, 122 are thus disposed such that the reciprocator 120 is between the pole pieces 108 and 114 and the reciprocator 122 is between the pole pieces 110 and 112. A further pair of reciprocators 124, 126 are disposed such that the reciprocator 124 is between the pole pieces 114 and 116 and the reciprocator 126 is between the pole pieces 112 and 118. In this embodiment, another pair of reciprocators 128, 130 are disposed above the pole pieces 108 and 110. Finally a further pair of reciprocators that are obscured in FIG. 1A are disposed below the pole pieces 116 and 118. This further pair of reciprocators are shown in FIG. 1B in a schematic cross-sectional view as reciprocators 132 and 134 disposed below the pole pieces 116 and 118. The reciprocators are fabricated from a magnetically permeable material, such as steel. In some embodiments the reciprocators may be fabricated from laminated sheets to reduce generation of eddy currents within the reciprocators.

The pair of reciprocators 128 and 130 are mechanically coupled by a U-shaped linkage 136 in this embodiment. Further linkages 138 and 140 mechanically couple the pair of reciprocators 120 and 122 to the respective reciprocators 128 and 130 and further linkages 146 and 148 couple the respective reciprocators 124 and 126 to the pair of reciprocators 132 and 134, as shown in FIG. 1B. Further in FIG. 1B, a pair of linkages 142 and 144 that are not visible in FIG. 1A couple the respective reciprocators 120 and 122 to the pair of reciprocators 124 and 126. Finally, as shown in FIG. 1B, a further optional U-shaped linkage 150 mechanically couples the pair of reciprocators 132 and 134. The linkages 136-150 are fabricated from a non-permeable material and mechanically couple the reciprocators for linear reciprocating movement in a direction indicated by the arrow 152.

The apparatus 100 further includes a closing piece associated with each pair of reciprocators for channeling magnetic flux between the respective reciprocator pairs to complete the respective magnetic circuits. For example, the closing piece 154 is disposed to complete a magnetic circuit for channeling magnetic flux generated by either of the first and second magnetic flux generators 102, 104 between the pair of reciprocators 120 and 122. In the embodiment shown, the closing piece 154 includes portions 156, 158, 160 and 162 that are magnetically coupled to channel magnetic flux through the closing piece between the reciprocators 120 and 122. In FIG. 1A, the closing piece portion 160 is shown partly cut away to reveal details of the second magnetic flux generator 104. The other pairs of reciprocators 124 and 126, 128 and 130, and 132 and 134 have respective closing pieces 164, 166, and 168. In some embodiments the closing pieces may be fabricated from laminated sheets to reduce generation of eddy currents.

The apparatus 100 also includes a current carrying coil 170, which in this embodiment is wound around the closing pieces 154 and 168 that extend forwardly with respect to the apparatus 100. The coil 170 has terminals 172 and 174 and is disposed to electromagnetically interact with the magnetic flux passing through the closing pieces 154 and 168. The apparatus 100 also includes a current carrying coil 176, which in this embodiment is wound around the closing pieces 164 and 166 that extend rearwardly with respect to the apparatus 100. The coil 176 has terminals 178 and 180 and is disposed to electromagnetically interact with the magnetic flux passing through the closing pieces 164 and 166. In other embodiments, the closing pieces 154, 164, 166, and 168 may have a separate coil wound around each closing piece.

Figure 2A:
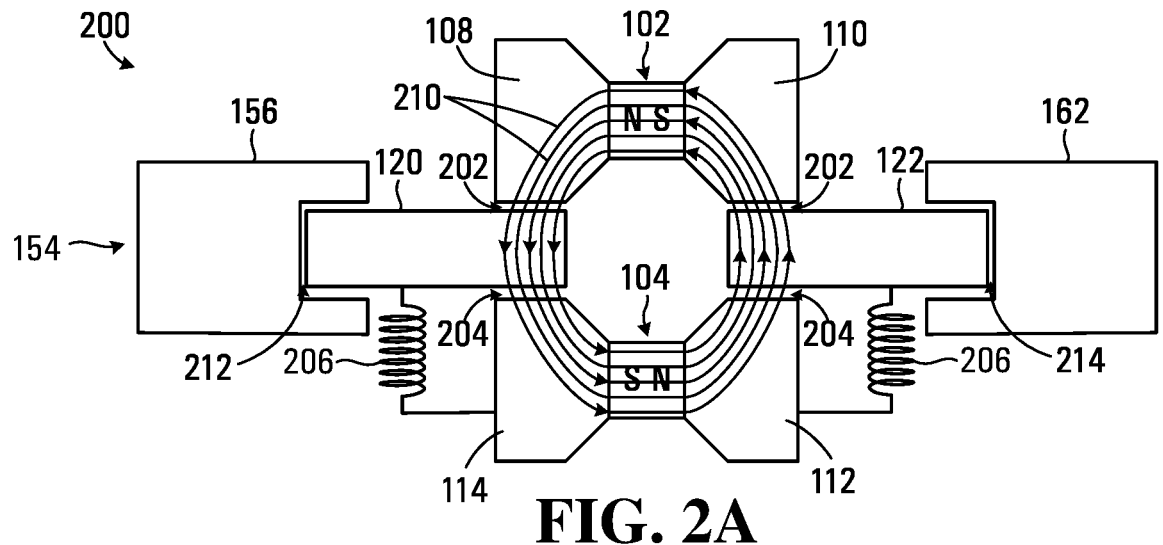
FIG. 2A is a schematic view of an elementary working unit of the electromagnetic transducer apparatus shown in FIG. 1 in a first operational state.
Figure 2B:
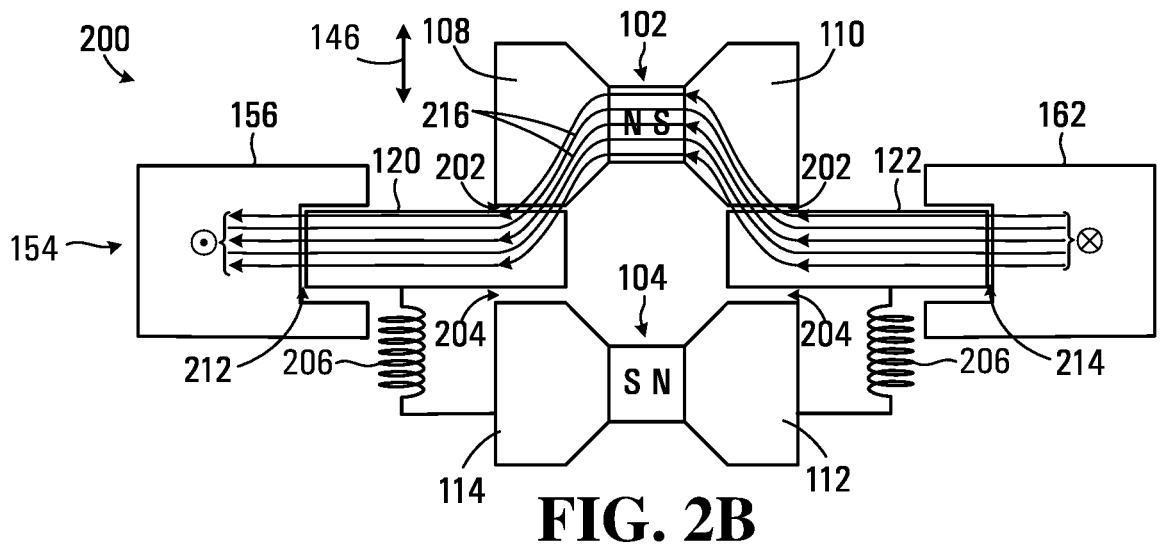
FIG. 2B is a schematic view of the elementary working unit of the electromagnetic transducer apparatus shown in FIG. 1 in a second operational state.
Figure 2C:
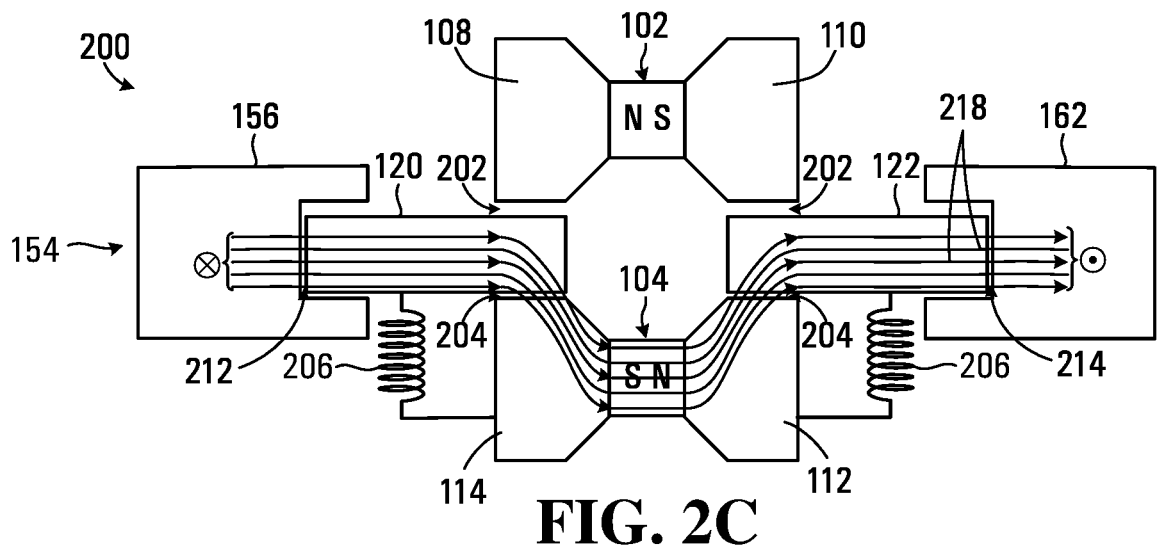
FIG. 2C is a schematic view of the elementary working unit of the electromagnetic transducer apparatus shown in FIG. 1 in a third operational state.

Operation of the apparatus 100 is described with reference FIGS. 2A-2C, in which the first and second magnetic flux generators 102 and 104, the respective pole pieces 108, 110, 112, and 114, the pair of reciprocators 120 and 122, and the portions 156 and 162 of the closing piece 154 are shown schematically. Other elements of the apparatus 100 such as the remaining portions 158 and 160 of the closing piece 154 have been omitted in FIGS. 2A to 2C for sake of clarity. The depicted elements in FIGS. 2A-2C represent an elementary working unit 200 of the apparatus 100. The embodiment of the apparatus 100 shown in FIG. 1A includes a further working unit that incorporates the second magnetic flux generator 104 and the third magnetic flux generator 106. The function of the additional pair of reciprocators 128 and 130 above the magnetic flux generators 102 and associated closing piece 166 and the pair of reciprocators 132 and 134 and the associated closing piece 168 will be described later herein.

Referring to FIG. 2A, the reciprocators 120 and 122 are spaced apart from the pole pieces 108 and 110 of the first magnetic flux generator 102 by a first air gap 202 and spaced apart from the pole pieces 112 and 114 of the second magnetic flux generator 104 by a second air gap 204. Since the reciprocators 120 and 122 are mechanically coupled, the air gap between the pole piece 108 and the reciprocator 120 will be substantially the same size as the air gap between the pole piece 110 and the reciprocator 122. In the embodiment shown the pole pieces extend laterally with respect to the magnetic flux generators 102 and 104 and have a portion overlapping the respective reciprocators 120 and 122. The overlapping portions provide the respective first and second air gaps 202 and 204.

In the embodiment shown the reciprocators 120 and 122 are suspended between the pole pieces 108-114 on a spring suspension 206 that disposes the reciprocators equidistantly between the pole pieces. The suspension is not shown in FIG. 1A to avoid obscuring portions of the apparatus 100. In FIG. 2A, the reciprocator pair 120, 122 are thus disposed such that the first air gap 202 and second air gap 204 are substantially the same size, which causes a magnetic reluctance of the air gaps to be substantially the same. By "substantially the same size" it is meant that the gaps may differ by a small amount within mechanical tolerances associated with fabrication and assembly processes. The portions 156 and 162 of the closing piece 154 are coupled to complete a magnetic circuit through an air gap 212 and an air gap 214 via the closing piece portions 158 and 160, which are not shown in FIGS. 2A-2C. In this embodiment the closing piece 154 is statically disposed in relation to the first and second magnetic flux generators 102 and 104. The closing piece 154 is also spaced apart from the respective reciprocators 120 and 122 by the air gaps 212 and 214 to facilitate motion of the reciprocators while coupling magnetic flux generated by the first and second magnetic flux generators through the magnetic circuit.

Figure 3:
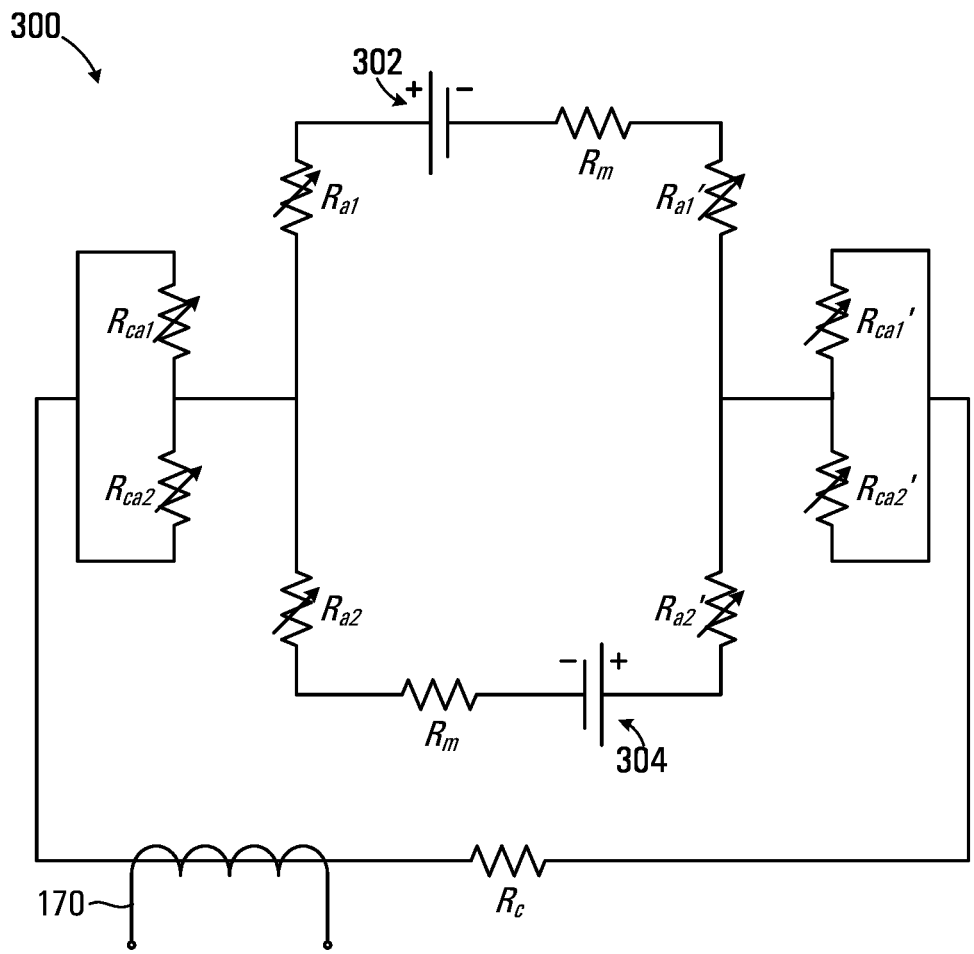
FIG. 3 is a schematic diagram of an equivalent magnetic circuit for the elementary working unit shown in FIG. 1.

An equivalent magnetic circuit for the elementary working unit 200 is shown at 300 in FIG. 3. The magnetic reluctance of the various components in the magnetic circuit are represented as resistors. The magnetic flux generators 102 and 104 are each represented as voltage sources 302 and 304 having an internal reluctance represented by resistors $R_m$. The variable resistors $R_{a1}$, $R_{a2}$ represent the respective reluctances of the first air gap 202 and second air gap 204. The reluctance of portions of the reciprocator 120 that channel magnetic flux are relatively small compared to $R_m$ and the air gap reluctances and are omitted in this analysis. As the reciprocator 120 moves closer to the pole piece 108, $R_{a1}$ will reduce while $R_{a2}$ will increase. When the reciprocator 120 moves closer to the pole piece 114, $R_{a2}$ will increase while $R_{a1}$ will reduce. The air gap 212 is represented by separate variable resistors $R_{ca1}$ and $R_{ca2}$. Two reluctances are used to model air gap 212 because, as drawn in FIG. 1A and FIG. 1B, portions of air gap 212 changes size as the reciprocator 120 moves. The reluctances of $R_{ca1}$ and $R_{ca2}$ may change as the reciprocator 120 moves but the parallel combination is relatively constant and made as low as possible by minimizing the respective air gaps while still permitting free motion of reciprocator 120. Similar reluctances for the portion of the magnetic circuit through the reciprocator 122 and the portion 162 of the closing piece 154 are modeled by resistors $R_{a1}'$, $R_{a2}'$, $R_{ca1}'$, and $R_{ca2}'$ as shown in FIG. 3. The resistor $R_c$ represents the reluctance through the portions 156, 158, 160 and 162 of the closing piece 154, which is typically small compared to other reluctances in the circuit. The magnetic reluctance provided by the pole pieces 108-114 will also be relatively small and may be included in the air gap reluctances $R_{a1}$, $R_{a1}'$, $R_{a2}$ and $R_{a2}'$.

When the reciprocators 120, 122 are spaced equidistantly between the pole pieces 108-114 as shown in FIG. 2A, the lowest reluctance path for flux generated by the first magnetic flux generator 102 is through $R_{a1}$, through the reciprocator 120, through $R_{a2}$, to the second magnetic flux generator 104. Similarly for the second magnetic flux generator 104, the lowest reluctance path for flux generated by the second magnetic flux generator is through $R_{a2}'$, through the reciprocator 122, through $R_{a1}'$, to the first magnetic flux generator 102. Although a very minimal leakage flux may possibly flow through $R_c$, in the state shown in FIG. 2A there will be no appreciable electromagnetic interaction between the flux and the current carrying coil 170. The magnetic flux thus flows predominantly through the portion of the reciprocators 120 and 122 between the respective pole pieces 108-114. Under these conditions, the magnetic flux flow from the magnetic flux generators 102 and 104 is indicated by lines 210 and is largely limited by the internal reluctance of the magnetic flux generators $R_m$. The magnetic flux 210 follows a path of least reluctance through the pole piece 108, through the first air gap 202, the reciprocator 120, and the second air gap 204, and through the pole piece 114 to the second magnetic flux generator 104. The magnetic flux from the magnetic flux generator 102 and the magnetic flux generated by the second magnetic flux generator 104 will also follow a path of least reluctance through the pole piece 112, through the second air gap 204, the reciprocator 122, and the first air gap 202, through the pole piece 110, and back to the first magnetic flux generator 102.

Referring to FIG. 2B, the pair of reciprocators 120, 122 are shown disposed such that the first air gap 202 is smaller than the second air gap 204. The second air gap 204 will thus present a significantly higher reluctance than the first air gap 202 causing the reluctances $R_{a2}$ and $R_{a2}'$ to significantly increase, while the reluctances $R_{a1}$ and $R_{a1}'$ decrease correspondingly. The lowest reluctance path for flux generated by the first magnetic flux generator 102 is thus through $R_{ca1}$ in parallel with $R_{ca2}$, through the closing piece $R_c$ and back to the first magnetic flux generator through $R_{ca1}$ in parallel with $R_{ca2}$ the 102. The magnetic flux now flows predominantly through the closing piece 154 as indicated by the arrows 216. The magnetic flux thus flows in a first direction via the first air gap 202, through the reciprocator 120, and the air gap 212, and through the closing piece portion 156. At the closing piece portion 156, the magnetic flux 216 flows out of the plane of the page, through the closing piece portion 160, and back into the plane of the page through the portion 162. The magnetic circuit is completed through the air gap 214, through the reciprocator 122, the first air gap 202, and back to the first magnetic flux generator 102. The magnetic flux 216 flowing through the closing piece portion 160 is thus in a first direction and electromagnetically interacts with the current carrying coil 170.

In FIG. 2B, no magnetic flux is shown for the second magnetic flux generator 104, although in practice some leakage flux may couple through the air gap 204 into the reciprocators 120, 122. When the elementary working unit 200 is incorporated in the apparatus 100 of FIG. 1A, most of the magnetic flux generated by the second magnetic flux generator 104 within the apparatus 100, would couple through the pair of reciprocators 124, 126 and through the closing piece 164, as described in more detail later herein.

Referring to FIG. 2C, the pair of reciprocators 120, 122 are shown disposed such that the first air gap 202 is larger than the second air gap 204. The first air gap 202 will thus present a significantly higher reluctance than the second air gap 204, causing the reluctances $R_{a1}$ and $R_{a1}'$ to be significantly increased, while the reluctances $R_{a2}$ and $R_{a2}'$ have a corresponding decrease.

The lowest reluctance path for flux generated by the second magnetic flux generator 104 is thus through $R_{ca1}'$ in parallel with $R_{ca2}'$, through the closing piece $R_c$ and back to the second magnetic flux generator through $R_{ca1}$ in parallel with $R_{ca2}$. The resulting magnetic flux is indicated by arrows 218 and now flows in a second direction via the second air gap 204, through the reciprocator 122, the air gap 214, and through the closing piece portion 162. The magnetic flux 218 flows out of the plane of the page at the closing piece portion 162, through the closing piece portion 160, and back into the plane of the page through the portion 156. The magnetic circuit is completed through the air gap 212, through the reciprocator 120, the second air gap 204 and back to the second magnetic flux generator 104. The magnetic flux 218 flowing through the closing piece portion 160 is thus in the second direction and electromagnetically interacts with the current carrying coil 170.

In FIG. 2C, no magnetic flux is shown for the first magnetic flux generator 102, although in practice some leakage flux may couple through the air gap 202 into the reciprocators 120, 122. Most of the magnetic flux generated by the first magnetic flux generator 102 within the apparatus 100, would couple through the pair of reciprocators 128, 130 and through the closing piece 166.

The apparatus 100 may be operated either in an electrical generator mode or in a reciprocating motor mode. In the generator mode an actuator (not shown) may be coupled via the linkage 136 shown in FIG. 1A to deliver a drive force to cause alternating motion of the pair of reciprocators 120, 122. The alternating motion changes the relative sizes of the first and second air gaps 202 and 204, which causes a changing magnetic flux in the magnetic circuit. The magnetic flux 210 shown in FIG. 2A, will gradually change as the reciprocators 120 and 122 are displaced upwardly, to reach the state of magnetic flux 216 shown in FIG. 2B. As the reciprocators 120 and 122 reverse direction and commence downward motion, the magnetic flux transitions back toward the state shown in FIG. 2A. The magnetic flux flow will then gradually change as the reciprocators 120 and 122 are displaced downwardly to reach the state of magnetic flux 218 shown in FIG. 2C. The magnetic flux thus changes in both magnitude and direction and electromagnetically induces an electromotive force (emf) in the coil 170.

As an example, a magnetic flux generators 102 and 104 that includes a Neodymium/Iron/Boron magnet may be capable of generating a magnetic flux density of about 1 T under the conditions shown in FIG. 2A and FIG. 2C. Assuming that a cross-section area of the closing piece 154 is the same as the cross-sectional area of the magnets in the magnetic flux generators 102 and 104, the magnetic flux density in the closing piece portion 160, around which the current carrying coil 170 is wound, will thus vary between +1 T and −1 T. This has an advantage over non-reversing magnetic flux transducer configurations, where the change in flux would be limited to the range between 0 T and +1 T. For a coil with N turns wrapped around closing piece 154 the emf generated may be expressed as follows:

$$\varepsilon = N \frac{d\Phi}{dt}$$

where ∈ is the EMF generated by the coil, N is the number of turns in the coil around the closing piece 160, and ϕ is the magnetic flux passing through the closing piece 160. The emf E for the magnetic flux reversing configuration shown is thus doubled over a configuration has a non-reversing flux. The coil terminals may be connected to deliver current to a load (not shown), which configures the working unit 200 for operation as an electrical energy generator. The emf generated at the coil terminals will have a cycle frequency that corresponds to a frequency of the supplied actuation force.

In another embodiment, a material such as a cobalt alloy electrical steel may be used to fabricate the reciprocators 120, 122. Cobalt alloy electrical steel saturates at a magnetic flux density of about 2 T, whereas common electrical steels would saturate at just over 1 T. The cross-section area of cobalt alloy reciprocators 120, 122 may thus be reduced by about 50% while facilitating the same total magnetic flux through the reciprocators at increased magnetic flux density. For the 1 T Neodymium/Iron/Boron magnet described above, this configuration would result in a change in magnetic flux density in the reciprocators of between −2 T and +2 T. However the total magnetic flux ϕ and the generated emf would still be the same. Under these conditions the moving mass of the reciprocator 120, 122 would be halved.

In the reciprocating motor mode, an alternating current source (not shown) may be connected to the terminals of a coil wound around closing piece 154 to supply a current to the coil. For a sinusoidal current waveform, the magnetic flux induced in the closing piece 154 will vary sinusoidally in both magnitude and direction. When a non-zero current flows through the coil in a direction that induces a magnetic flux in the same direction as the magnetic flux 216 (as shown in FIG. 2B), the induced magnetic flux exerts an upward force on the reciprocators 120 and 122.

When the current again passes through zero, the current induced magnetic flux changes direction within the magnetic circuit and flows in the same direction as the magnetic flux 218 shown in FIG. 2C. This causes a downward force on the reciprocators 120 and 122. The reciprocators 120 and 122 may undergo a reciprocating linear movement in the direction 152 in response to this alternating force that will have a cycle frequency that corresponds to a frequency of the supplied alternating current. The magnitude of the linear motion will depend on an external mechanical damping load attached to the actuator.

For the elementary working unit 200 shown in FIGS. 2A-2C, there are times in the operating cycle (2B and 2C) where only one of the magnetic flux generators 102 and 104 is generating usable magnetic flux. If the elementary working unit 200 were to be operated in isolation, the magnetic flux generated by the other magnetic flux generator would be leaked or may even act counter to the magnetic flux generated by the effective magnetic flux generator. However, as shown in FIG. 1A, several of the elementary working units 200 may be arranged in a stack configuration such that each magnetic flux generator generates usable magnetic flux. Referring back to FIG. 1A, when the linkages 136 and the reciprocators 120-130 move upwardly, magnetic flux generated by the magnetic flux generator 102 passes through the magnetic circuit provided by the reciprocators 120 and 122 and the closing piece 154. At the same time, magnetic flux generated by the magnetic flux generator 104 passes through the magnetic circuit provided by the reciprocators 124 and 126 and the closing piece 164. When the linkages 136 and the reciprocators 120-130 move upwardly, magnetic flux generated by the magnetic flux generator 102 passes through the magnetic circuit provided by the reciprocators 128 and 130 and the closing piece 166. The end of stack magnetic circuit provided by the reciprocators 128 and 130 and the closing piece 166 thus only ever carries magnetic flux in the second direction. A similar situation exists for the end of stack magnetic circuit provided by the closing piece 168 and the reciprocators 132 and 134 (FIG. 1B), which will only ever carry magnetic flux in the first direction. Each of the magnetic flux generators 102-106 thus alternate between which of the adjacent reciprocators their generated magnetic flux is delivered to.

When configured as a generator, the apparatus 100 induces a similar emf at the terminals 172 and 174 of the coil 170 and the terminals 178 and 180 of the coil 176. The respective generated emfs are however 180° out of phase but the terminals of one of the coils 170 and 176 may be connected together in reversed polarity with the terminals of the other coil. Similarly, when configured as a generator, the coils 170 and 176 would be connected to an alternating current source in reversed polarity.

Figure 4:
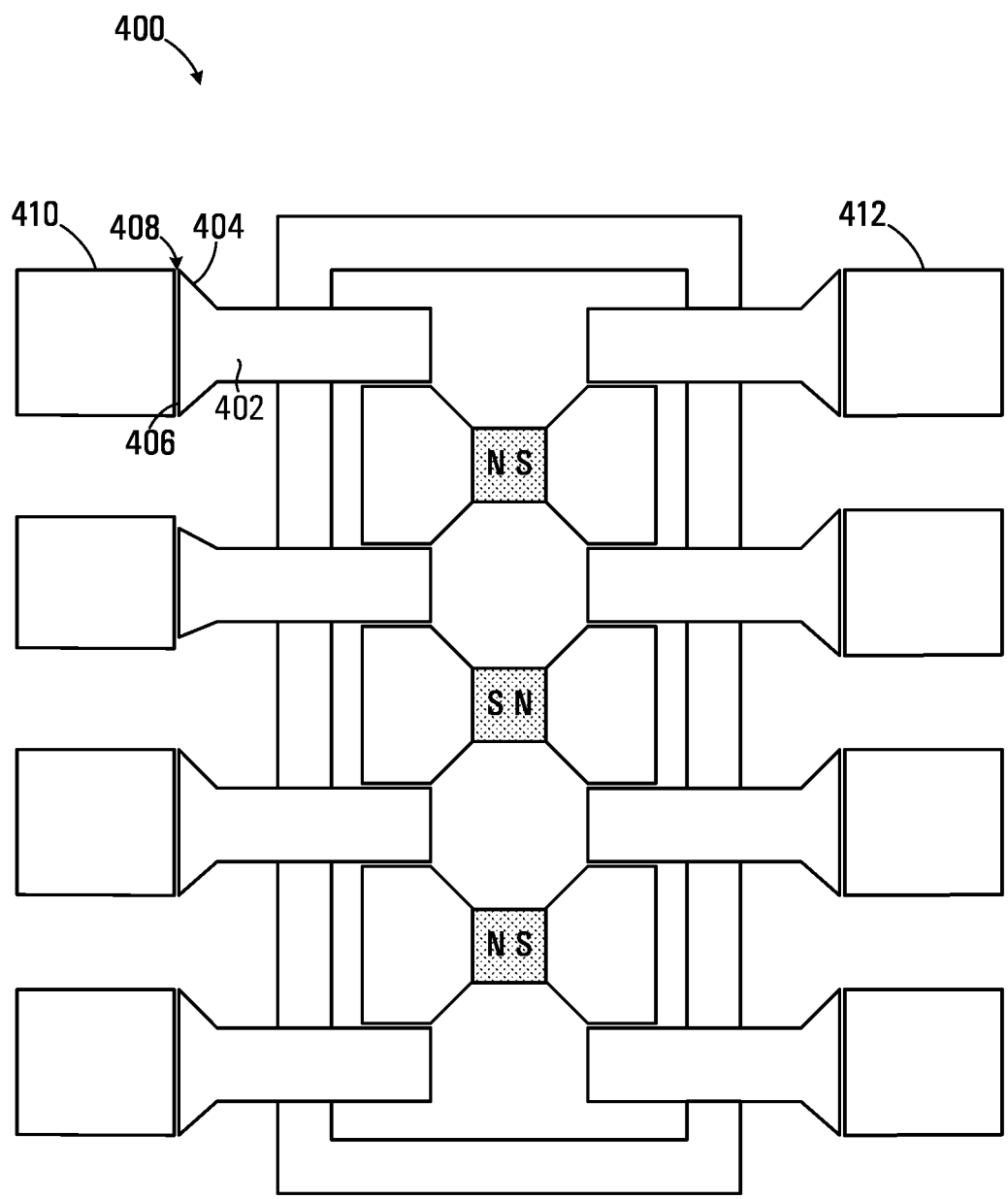
FIG. 4 is a schematic cross sectional view of an alternative embodiment of an electromagnetic transducer apparatus.

Referring to FIG. 4, an alternative configuration of the reciprocators and closing piece is shown in cross sectional view. In this embodiment, a transducer apparatus 400 includes a reciprocator 402, which has an outwardly flared portion 404 that provides a laterally oriented surface 406. The laterally oriented surface 406 is spaced apart by an air gap 408 from a closing piece portion 410. The closing piece portion 410 is coupled to a closing piece portion 412 on the opposite side via a further closing piece portion (not shown) that extends behind the transducer apparatus 400. The remaining reciprocators and closing pieces are similarly configured. In this embodiment the reluctance of the air gap 408 is substantially invariant with the motion of the reciprocators and thus the two parallel reluctances $R_{ca1}$ and $R_{ca2}$ in FIG. 3 may then be replaced by a single fixed reluctance. The flaring allows the reluctance of the air gap to be reduced.

Figure 5A:
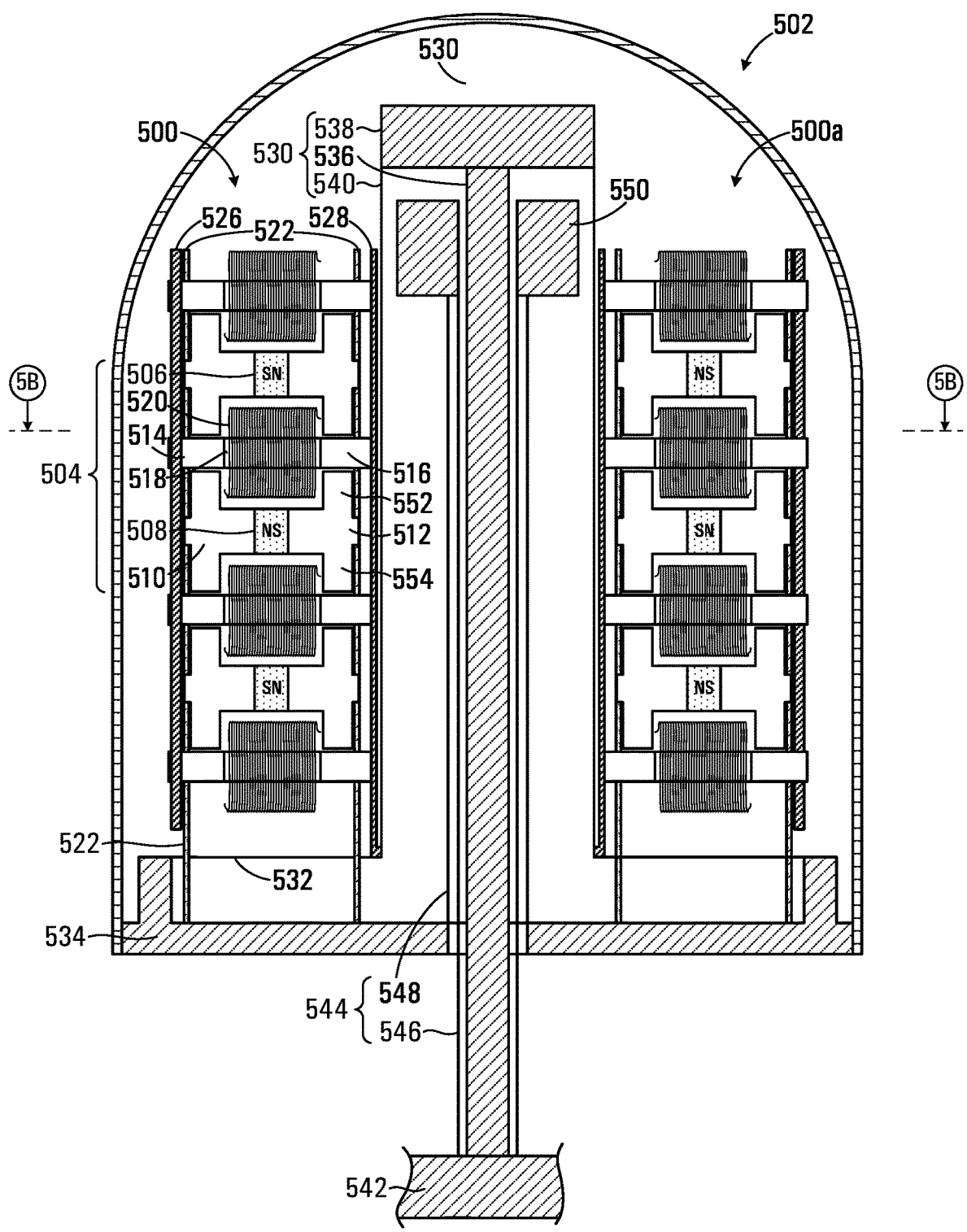
FIG. 5A is an elevational cross sectional view of another embodiment of an electromagnetic transducer apparatus.

In the embodiment shown in FIG. 1A, the closing pieces 154, 164, 166 and 168 are statically disposed with respect to the magnetic flux generators 102, 104 and 106 and the air gaps 212 and 214 permit motion of the pairs of reciprocators 120, 122, 124, 126, 128 and 130. An alternative embodiment of an electromagnetic transducer apparatus is shown at 500 in FIG. 5A. In FIG. 5A the apparatus 500 is shown configured in an electromagnetic transducer system 502 including a plurality of the alternative electromagnetic transducer apparatus 500. The electromagnetic transducer system 502 may be used with a Stirling cycle transducer, such as described in commonly owned U.S. Pat. No. 9,394,851 entitled "STIRLING CYCLE TRANSDUCER FOR CONVERTING BETWEEN THERMAL ENERGY AND MECHANICAL ENERGY", incorporated herein by reference in its entirety. The transducer system 502 is described in more detail below.

The electromagnetic transducer apparatus 500 includes a plurality of elementary working units 504. Each elementary working unit 504 includes a first magnetic flux generator 506 and a second magnetic flux generator 508, each having pole pieces 510, 512 coupled to direct magnetic flux generally as described above. The first and second magnetic flux generators 506 and 508 are adjacently disposed such that the pole pieces 510 and 512 of the first and second magnetic flux generators having opposite polarity are adjacently disposed in spaced apart relation. The apparatus further includes a pair of reciprocators 514 and 516. In this embodiment a closing piece 518 extends directly between the reciprocators to complete a magnetic circuit for channeling magnetic flux between the pair of reciprocators 514 and 518. The closing piece 518 is thus magnetically and mechanically coupled and thus moves in unison with the pair of reciprocators 514 and 516. In one embodiment the reciprocator 514, the closing piece 518, and the reciprocator 516 and may be fabricated as a single unitary element. The pair of reciprocators 514 and 516 are spaced apart from the pole pieces of the first magnetic flux generator 506 by a first air gap and spaced apart from the pole pieces of the second magnetic flux generator 508 by a second air gap, as described above for the embodiment shown in FIG. 1A. The elementary working unit 504 further includes a current carrying coil 520 disposed to electromagnetically interact with the magnetic flux passing through the closing piece 518. In this embodiment the coil 520 is would around the closing piece 518 and a bore of the current carrying coil is made sufficiently large to permit the motion of the closing piece within coil bore. The coil may thus be mounted stationary with respect to the moving reciprocators 514 and 516 and the closing piece 518.

In other embodiments the coil 520 may be wound around another portion of the magnetic circuit through which the magnetic flux flows. For example, a coil may be wound about the portions 552 and 554 of the pole piece 512, since the magnetic flux by the magnetic flux generators 508 also flows through this part of the magnetic circuit. In the context of the electromagnetic transducer system 502, the coil may be wound around each of the pole piece portions 552 and 554 for the other electromagnetic transducer apparatuses 500 in the system. In this case the electromagnetic transducer system 502 would have six separate coils that looped about the respective portions of the pole pieces of the electromagnetic transducer apparatuses 500 in the electromagnetic transducer system 502. In this case the coil would thus electromagnetically interact with the magnetic flux passing through the respective magnetic circuits of each electromagnetic transducer apparatus 500.

In addition to the elementary working unit 504 referenced in FIG. 5A, the apparatus 500 also includes additional magnetic flux generators, respective pole pieces, associated pairs of reciprocators, and associated closing pieces as described above in connection with FIG. 1B. These additional elements are disposed in a stack configuration such that each of the magnetic flux generators are disposed adjacently with a respective pair of reciprocators between the adjacent magnetic flux generators.

The magnetic flux generators 506 and 508 and other magnetic flux generators in the stack of the apparatus is shown at 500 and their respective pole pieces are supported in spaced apart relation within in a frame 522 that extends downwardly and is secured to a base structure 534 of the transducer system 502. The reciprocators 514, 516 and other reciprocators in the stack are supported between an outer reciprocator support 526 and an inner reciprocator support 528.

Figure 5B:
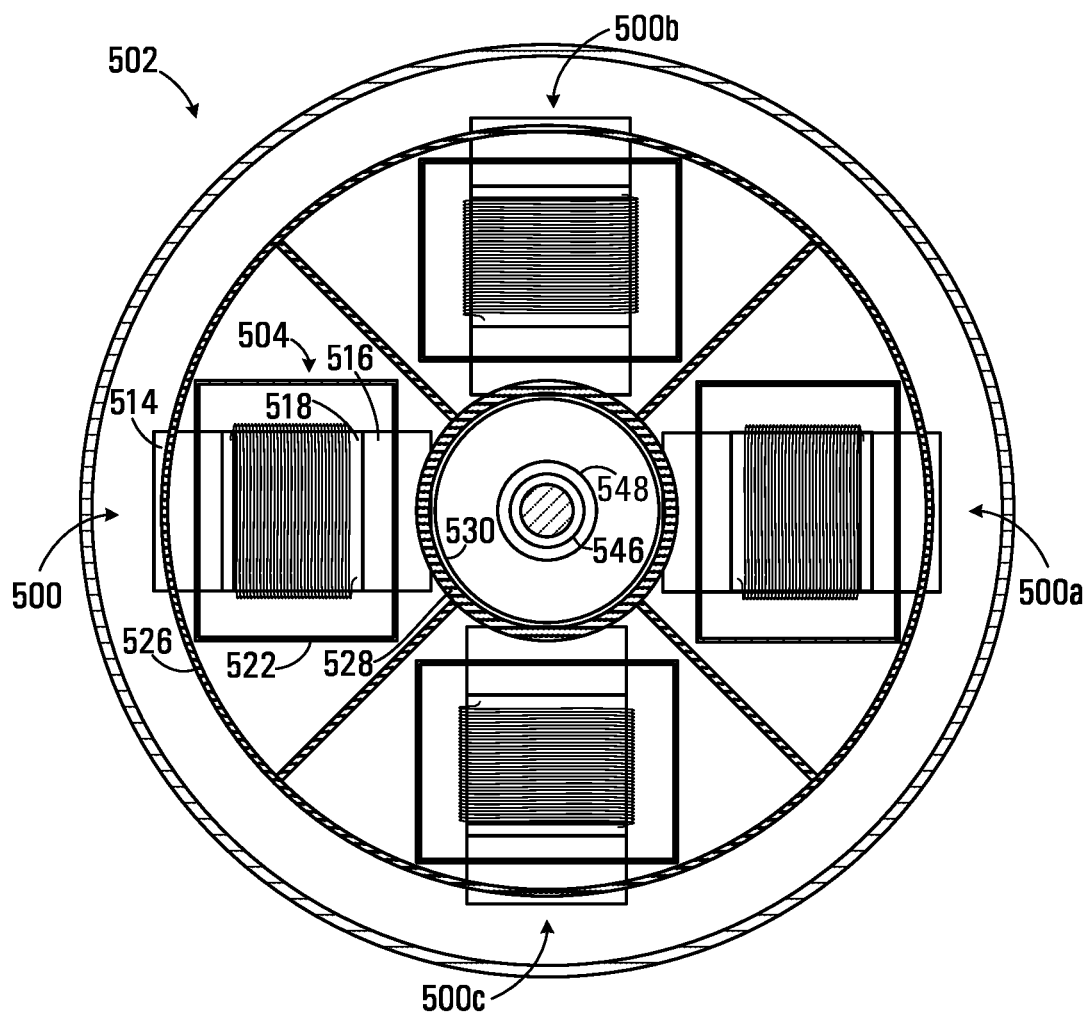
FIG. 5B is a plan view of the electromagnetic transducer apparatus shown in FIG. 5A.

The transducer system 502 and elementary working unit 504 are shown in a top sectional view in FIG. 5B (taken along the line 5B-5B in FIG. 5A). In this embodiment four of the electromagnetic transducer apparatus 500 are disposed in radially spaced configuration. In other embodiments the transducer system 502 may include a fewer or greater number of electromagnetic transducers 500. Referring to FIG. 5B, the reciprocator supports 526 and 528 are configured as concentric cylindrical shells. The pair of reciprocators 514 and 516 and the closing piece 518 extend between the inner reciprocator support 528 and the outer reciprocator support 526 and are supported in slots (not shown) formed in the walls of the respective supports. Referring back to FIG. 5A, the inner reciprocator support 528 is connected at a lower end to a drive coupling 530 of the transducer system 502. The inner reciprocator support 528 is constrained to pure axial motion by leaf springs 532 attached to a base 534 of the transducer system 502. The frame 522 that supports the magnetic flux generators has a rectangular box configuration in this embodiment and is secured to the stationary base structure 534 of the transducer system 502. The magnetic flux generators are thus supported in fixed relation to the transducer.

The current carrying coil 520 inner windings are sized such that the reciprocators 514, 516 and other reciprocators in the stack are able to move freely within the respective coils. The current carrying coil 520 is wound about the closing piece 518 in spaced apart relation to provide for free reciprocating movement of the closing piece and reciprocators 514 and 516 within the coil. The coil 520 is mounted statically with respect to the magnetic flux generators 506 and 508, for example by embedding the coils within the frame 522 using a potting epoxy.

The drive coupling 530 includes a shaft 536 coupled to a movable element 542 and a tube 540 coupled to the reciprocator support 528 and compliant leaf spring suspension 532. The tube 540 and shaft 536 are connected via an intermediate connector portion 538.

In operation with the transducer system 502 in a Stirling cycle engine such as disclosed in U.S. Pat. No. 9,394,851, a heat input to the Stirling cycle apparatus causes a reciprocating movement of the shaft 536 via the moveable element 542 (which in this example would be a diaphragm of the Stirling cycle engine). The movement of the element 542 is coupled via the shaft 536 of the drive coupling 530, through the intermediate connector portion 538, and through the tube 540 to the reciprocator support 528, which causes reciprocating motion of the moveable pairs of reciprocators 514, 516 and other reciprocators in the stack. An axial compliance of the tube 540 and the shaft 536 permits axial flexing that increases an amplitude of the reciprocating movement of the reciprocator support 528 with respect to moveable element 542 connected to a lower end of the shaft 536. When the reciprocators 514, 516 are disposed such that the first air gap is smaller than the second air gap, magnetic flux generated by the first magnetic flux generator 506 flows in a first direction via the first air gap through the closing piece 518. When the pair of reciprocators 514, 516 are disposed such that the second air gap is smaller than the first air gap, magnetic flux generated by the second magnetic flux generator 508 flows in a second opposite direction via the second air gap through the closing piece 518. The coil 520 electromagnetically interacts with the magnetic flux passing through the closing piece 518. The coil 520 and each of the coils of the other elementary working units 504 in the electromagnetic transducer apparatus 500 thus generate an emf. The respective coils of the electromagnetic transducer system 502 may be connected together in various parallel or serial arrangements to provide an output voltage and current.

Alternatively, in operation of a Stirling cycle transducer as heat pump, current supplied to the current carrying coil 520 and other coils of the other elementary working units 504 causes a reciprocating motion of the pair of reciprocators 514, 516, which is transmitted via the reciprocator support 528 and the drive coupling 530 to the moveable element 542, which in this case would be a diaphragm of the Stirling cycle heat pump. The reciprocation of the moveable element 542 causes the reciprocating mechanical energy to be converted into a thermal energy transfer from lower temperature to higher temperature in the Stirling cycle apparatus (of which only the transducer 502 is shown in FIG. 5A and FIG. 5B). In other embodiments the electromagnetic transducer system 502 may be configured for use with a moving system other than a Stirling cycle transducer.

In the embodiment shown in FIG. 5A, the electromagnetic transducer system 502 includes a cylindrical tube spring 544, coupled between the diaphragm moveable element 542 and the housing base 534. The cylindrical tube spring 544 includes an inner wall 546 and an outer wall 548 coupled together by an interconnect 550. The tube spring 544 is configured to elastically deform in a direction generally aligned with an axis of the electromagnetic transducer system 502 in response to forces imparted on the tube spring by the moveable element 542 to cause the first system to have a desired natural frequency. The tube spring 156 further provides a restorative force to the moveable element 542 during the reciprocating motion. The tube spring 156 also indirectly provides a restorative force to the reciprocator supports 528, 526 and all the attached reciprocators 514,516 and closing pieces 518 through drive coupling 530.

While specific embodiments have been described and illustrated, such embodiments should be considered illustrative only and not as limiting the disclosed embodiments as construed in accordance with the accompanying claims.

What is claimed is:

1. An electromechanical transducer apparatus for converting between mechanical energy and electrical energy, the apparatus comprising:
    a first magnetic flux generator and a second magnetic flux generator, each including a plurality of pole pieces, a first pole piece of the plurality of pole pieces coupled to direct magnetic flux from a respective magnetic flux generator of the first and second magnetic flux generators and a second pole piece of the plurality of pole pieces coupled to direct the magnetic flux back to the respective magnetic flux generator, the first and second magnetic flux generators being adjacently disposed such that pole pieces of the first and second magnetic flux generators having opposite polarity are adjacently disposed in spaced apart relation;
    a pair of reciprocators mechanically coupled for reciprocating movement between the pole pieces of the first and second magnetic flux generators which are adjacently disposed, each reciprocator of the pair of reciprocators being spaced apart from the plurality of pole pieces of the first magnetic flux generator by a first air gap and spaced apart from the plurality of pole pieces of the second magnetic flux generator by a second air gap;
    a closing piece disposed to complete a magnetic circuit for channeling the magnetic flux generated by either of the first and second magnetic flux generators between the pair of reciprocators,
        wherein when the pair of reciprocators are disposed such that the first air gap is smaller than the second air gap, the magnetic flux generated by the first magnetic flux generator flows in a first direction via the first air gap through the closing piece; and
        wherein when the pair of reciprocators are disposed such that the second air gap is smaller than the first air gap, the magnetic flux generated by the second magnetic flux generator flows in a second direction via the second air gap through the closing piece, the second direction being opposite to the first direction; and
    at least one-current carrying coil disposed to electromagnetically interact with the magnetic flux passing through the magnetic circuit.

2. The apparatus of claim 1 further comprising a current source connected to supply an alternating current to the at least one current carrying coil, the alternating current being operable to electromagnetically induce a changing magnetic flux within the closing piece, the changing magnetic flux varying in magnitude and direction and being operable to cause a corresponding alternating force on the pair of reciprocators.

3. The apparatus of claim 1 further comprising an actuator operable to cause alternating motion of the pair of reciprocators, the alternating motion causing a changing magnetic flux in the magnetic circuit operable to electromagnetically induce an electromotive force (emf) in the at least one current carrying coil.

4. The apparatus of claim 1 wherein each pole piece of the plurality of pole pieces extend laterally with respect to a respective one of the first and second magnetic flux generators and each pole piece of the plurality of pole pieces has an overlapping portion overlapping respective reciprocators of the pair of reciprocators, the overlapping portions providing the first and second air gaps.

5. The apparatus of claim 1 wherein a cross sectional area of the pair of reciprocators is less than a cross sectional area of the first and second magnetic flux generators.

6. The apparatus of claim 1 wherein the pair of reciprocators are coupled to a shaft having first and second ends, the shaft being at least partially compliant and being operable to cause reciprocating motion at one end of the shaft to have a greater amplitude than the reciprocating motion at another end of the shaft.

7. The apparatus of claim 1 wherein each reciprocator of the pair of reciprocators includes an overlapping portion overlapping the pole pieces of the first and second magnetic flux generators which are adjacently disposed and an outwardly extending portion extending outwardly away from the pole pieces of the first and second magnetic flux generators which are adjacently disposed and wherein the closing piece extends between respective outwardly extending portions of each reciprocator of the pair of reciprocators for completing the magnetic circuit.

8. The apparatus of claim 7 wherein the closing piece is statically disposed in relation to the first and second magnetic flux generators and spaced apart from each reciprocator of the pair of reciprocators by a sliding air gap to facilitate motion of the pair of reciprocators while coupling the magnetic flux through the closing piece via the respective sliding air gaps.

9. The apparatus of claim 1 wherein the pair of reciprocators are mechanically coupled via a spring suspension to the plurality of pole pieces.

10. The apparatus of claim 9 wherein the spring suspension comprises a tube spring.

11. The apparatus of claim 1 wherein the pair of reciprocators are configured for movement with an amplitude of about 400 μm.

12. The apparatus of claim 11 wherein the pair of reciprocators are fabricated from a cobalt electrical steel alloy.

13. The apparatus of claim 1 wherein the closing piece extends directly between the pair of reciprocators and moves in unison with the pair of reciprocators.

14. The apparatus of claim 13 wherein the pair of reciprocators and the closing piece are fabricated as a unitary element.

15. The apparatus of claim 13 wherein the at least one current carrying coil is wound about the closing piece spaced apart from the closing piece to provide for free reciprocating movement of the closing piece within the at least one current carrying coil, the at least one current carrying coil being mounted statically with respect to the first and second magnetic flux generators.

16. The apparatus of claim 1 further comprising:
at least one additional magnetic flux generator including an associated plurality of pole pieces, an associated pair of reciprocators, and an associated closing piece to complete an additional magnetic circuit, the at least one additional magnetic flux generator being disposed such that the associated pair of reciprocators are shared between the at least one additional magnetic flux generator and one of the first and second magnetic flux generators, the associated pair of reciprocators being mechanically coupled to the pair of reciprocators disposed between the first magnetic flux generator and the second magnetic flux generators; and
at least one associated current carrying coil disposed to electromagnetically interact with the magnetic flux passing through the additional magnetic circuit.

17. The apparatus of claim 16 wherein the first magnetic flux generator, the second magnetic flux generator, and the at least one additional magnetic flux generator is disposed in a wrapped around configuration such that each of the first, second and at least one additional magnetic flux generators are disposed adjacently.

18. The apparatus of claim 16 wherein the at least one additional magnetic flux generator comprises a plurality of additional magnetic flux generators, the associated pair of reciprocators comprises a plurality of associated pairs of reciprocators and the associated closing piece comprises a plurality of associated closing pieces to complete a plurality of additional magnetic circuits.

19. The apparatus of claim 18 wherein the at least one associated current carrying coil comprises a plurality of associated current carrying coils, wherein at least one of the plurality of associated current carrying coils is disposed to electromagnetically interact with the magnetic flux passing through more than one of the plurality of additional magnetic circuits.

20. The apparatus of claim 16 wherein the first magnetic flux generator, the second magnetic flux generator, and the at least one additional magnetic flux generator are disposed in a stacked configuration such that each of the first, second and at least one additional magnetic flux generators are disposed adjacently.

21. The apparatus of claim 20 further comprising:
a top pair of reciprocators and associated top closing piece adjacently disposed to a top one of the first, second and at least one additional magnetic flux generators at a top end of the stacked configuration; and
a bottom pair of reciprocators and associated bottom closing piece adjacently disposed to a bottom one of the first, second and at least one additional magnetic flux generator at a bottom end of the stacked configuration.

22. The apparatus of claim 21 wherein a plurality of the stacked configuration are disposed alongside each other with the respective pairs of reciprocators of each stacked configuration being mechanically coupled for motion.

* * * * *